(12) United States Patent
Adomeit et al.

(10) Patent No.: US 6,286,860 B1
(45) Date of Patent: Sep. 11, 2001

(54) AIR BAG RETENTION SYSTEM

(75) Inventors: Heinz-Dieter Adomeit; Eleonore Braun; Daniel Hahn, all of Berlin (DE)

(73) Assignee: Petri AG, Aschaffenburg (DE)

( * ) Notice: Subject to any disclaimer, the term of this patent is extended or adjusted under 35 U.S.C. 154(b) by 0 days.

(21) Appl. No.: 09/445,591
(22) PCT Filed: May 29, 1998
(86) PCT No.: PCT/DE98/01512
§ 371 Date: Dec. 10, 1999
§ 102(e) Date: Dec. 10, 1999
(87) PCT Pub. No.: WO98/56619
PCT Pub. Date: Dec. 17, 1998

(30) Foreign Application Priority Data

Jun. 12, 1997 (DE) .............................. 197 25 558

(51) Int. Cl.⁷ .................................................. B60R 21/18
(52) U.S. Cl. ........................................ 280/733; 280/730.1
(58) Field of Search .............................. 280/730.1, 733, 280/801.1, 808

(56) References Cited

U.S. PATENT DOCUMENTS

| | | | |
|---|---|---|---|
| Re. 36,587 * | 2/2000 | Tanaka et al. ................ | 280/733 |
| 3,146,460 | 9/1964 | Henderson . | |
| 3,430,979 | 3/1969 | Terry et al. ................ | 280/150 |
| 3,706,463 | 12/1972 | Lipkin ......................... | 280/150 |
| 3,830,519 | 8/1974 | Lewis .......................... | 280/150 |
| 3,866,940 | 2/1975 | Lewis .......................... | 280/150 |
| 3,933,370 | 1/1976 | Abe et al. .................... | 280/150 |
| 3,970,329 | 7/1976 | Lewis .......................... | 280/150 |
| 5,062,662 | 11/1991 | Cameron ...................... | 280/733 |
| 5,346,250 | 9/1994 | Kamiyama .................... | 280/733 |
| 5,947,513 * | 9/1999 | Lehto .......................... | 280/733 |
| 6,109,647 * | 8/2000 | Akaba et al. ................. | 280/733 |
| 6,116,637 * | 9/2000 | Takeuchi et al. ............. | 280/733 |
| 6,126,194 * | 10/2000 | Yaniv et al. .................. | 280/733 |
| 6,142,511 * | 11/2000 | Lewis .......................... | 280/733 |

FOREIGN PATENT DOCUMENTS

| | | |
|---|---|---|
| 2 358 070 | 6/1974 | (DE) . |
| 92 11 421 | 3/1993 | (DE) . |
| 42 32 041 | 4/1993 | (DE) . |
| 42 11 209 | 10/1993 | (DE) . |
| 44 30 412 | 10/1995 | (DE) . |
| 195 05 216 | 2/1996 | (DE) . |
| 94 18 721 | 5/1996 | (DE) . |

* cited by examiner

Primary Examiner—Eric Culbreth
Assistant Examiner—L. Lum
(74) Attorney, Agent, or Firm—Foley & Lardner

(57) ABSTRACT

The invention relates to an airbag retention system that is arranged in the area of the lower part of the body of the passenger. According to the invention, a gas bag is loosely placed on the body of the passenger in an inactivated state. Said gas bag has two ends enabling it to be secured to components of the vehicle. At least one end is secured to and can be detached from said vehicle. Preferably, the inactivated gas bag is placed loosely on the upper part of the legs of the passenger.

18 Claims, 22 Drawing Sheets

SECTION A-A

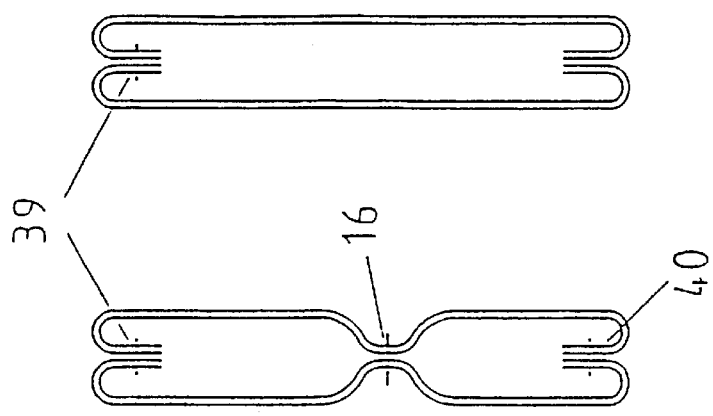
Fig. 30 SECTION B-B
Fig. 31 SECTION C-C
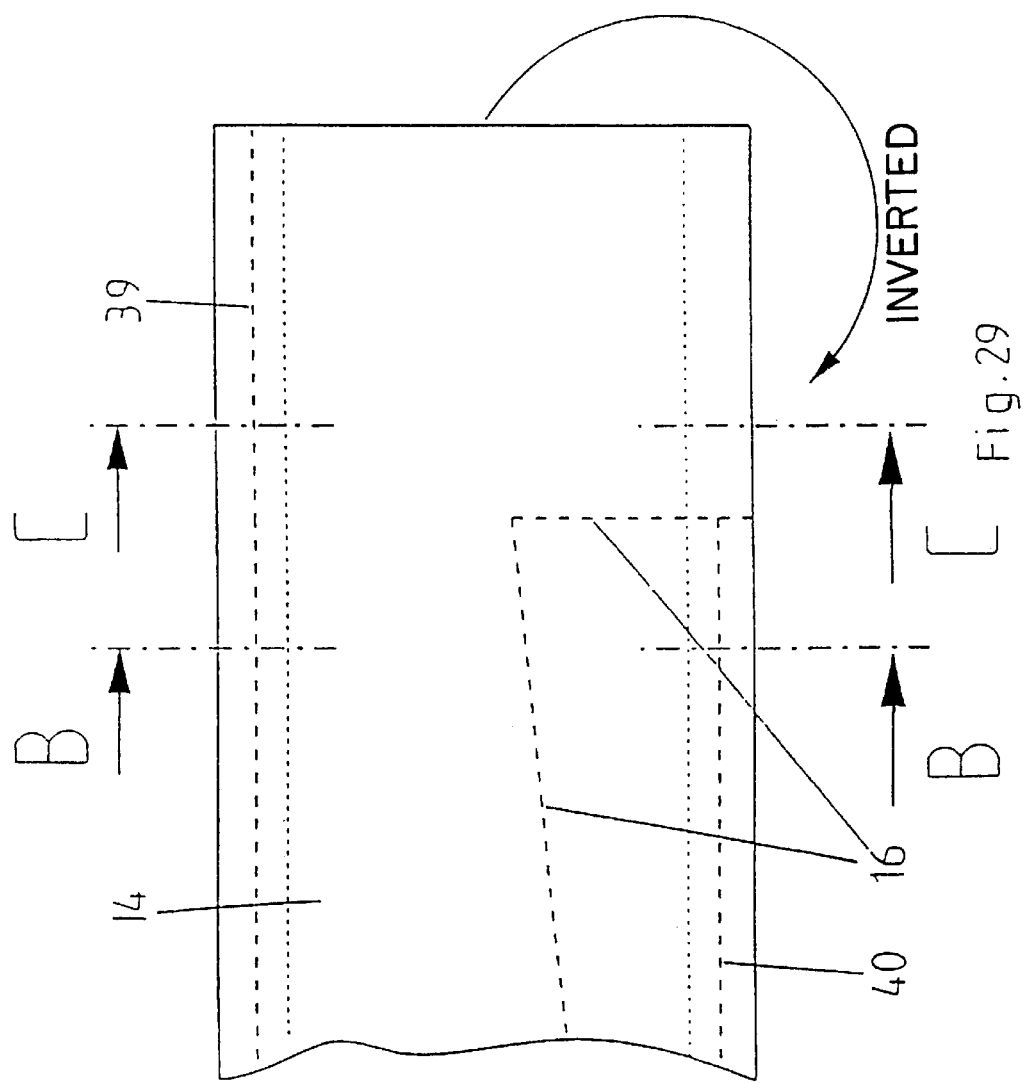
Fig. 29

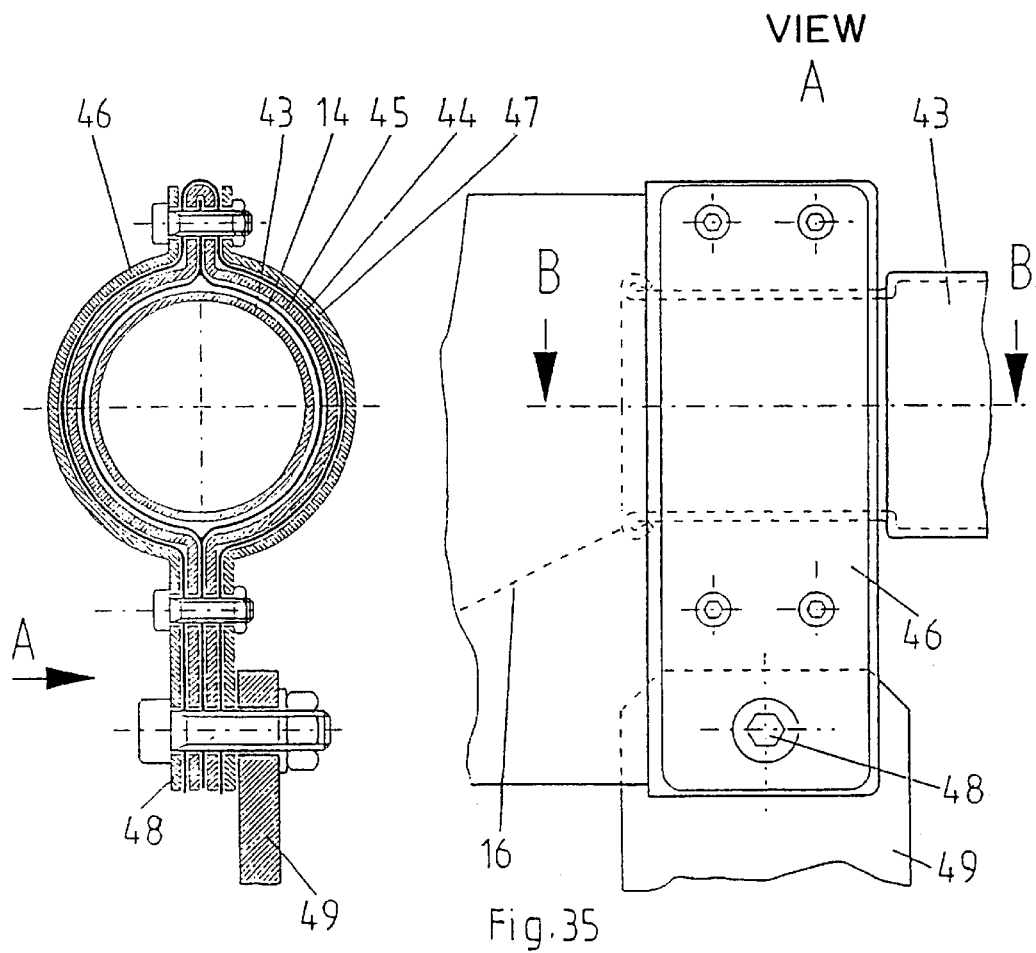

SECTION A - A

AIR BAG RETENTION SYSTEM

FIELD OF INVENTION

The invention relates to an airbag retention system.

BACKGROUND OF THE INVENTION

Airbag retention systems in the area of the pelvis of a passenger are known. With these known systems, airbags are placed on a lap belt, or a seat belt is formed as an airbag.

Thus, an airbag for seat belts is known from DE 43 06 528 A1 wherein an airbag pocket is fitted onto the existing belt and is connected to a compressed air line as well as to a compressed air generator and release mechanism. The advantage of this belt airbag is that as opposed to airbags that are stored on the steering wheel or on parts of the vehicle body in front of the passenger, this airbag is attached directly to the passenger, i.e., it is located right in the area where it is to exert its protective effect. With this arrangement, the upper part of the body and the head are additionally protected by the airbag. However, the area of the pelvis is as before only restrained by the lap belt. The lap belt's taut fit against the body and the lap belt's small contact surface area against the body can lead to injury in the event of a crash.

Furthermore, an inflatable seat belt unit is known from DE 42 32 041 A1 wherein at least a part of a section that is in contact with a passenger in a vehicle is formed in a bag-like shape. In the inactivated state, the bag-like section retains a belt-like shape. In the event of a crash, the seat belt is inflated and unfolded by gas. With this seat belt unit, the seat belt itself is thus formed in sections as an airbag. The contact bearing face of the seat belt is enlarged through the inflation of the bag-like section so that the strain on the body through the belt in the event of a crash is reduced. An additional protection of the upper body and head cannot however be achieved with this arrangement.

SUMMARY OF THE INVENTION

The object of the present invention is to further reduce the risk of injury for the passenger in the event of a crash.

With an airbag retention system that is arranged in the area of the lower part of the body of the passenger according to the invention, an inflatable gas bag is provided that in the inactivated state lies loosely on the body of the passenger and that has two ends by means of which it can be fixed on a component part of the motor vehicle wherein at least one end is detachably fastened on the motor vehicle. More particularly, a gas bag is provided that in the inactive state lies loosely on the upper thighs of the passenger.

As opposed to the known belt airbag, the gas bag arranged according to the invention does not lie fixed against the body in the inactivated state. In the event of a crash this gas bag is also inflated in the pelvic area both towards the passenger and towards the vehicle structural assembly opposite the passenger, e.g., towards the dashboard or the backrest of the front seat. The gas bag that adjoins the passenger at the bottom then spreads out upwards and along the body of the passenger whereby the passenger is also brought into an upright sitting position so that the head of the passenger is located in the upright position prior to the complete unfolding of the gas bag. The risk of injury through the gas bag spreading out upwards from the bottom is thereby reduced.

The retention action of the retention system according to the invention is based on a combined traction and compression strain of the gas bag. Thus, the gas bag adjoining the body of the passenger is already stressed and drawn in in the pelvic area in the first unfolding phase. At the same time, a compressive strain is produced through the gas bag being supported on the upper thighs. As the passenger moves further forward and the gas bag continues to unfold this gas bag is additionally supported on parts of the vehicle structure such as a steering wheel, dashboard, front window, or back of a front seat.

The ends of the gas bag are fixable on the motor vehicle through holders to the side or behind the passenger. The ends of the gas bag for fitting on the holders are designed narrower than the remaining area of the gas bag. Furthermore, it is expedient if the gas bag in the inactivated state is folded inside a cover that is torn open by the unfolding gas bag in the event of a crash.

It is advantageous if one end of the gas bag is connected by a supply line or diffuser pipe to a gas generator that is mounted on or next to the vehicle seat, on or in the central tunnel, on the floor, on the side wall, or on another part of the vehicle. It is then possible to hang the gas bag in the same way as a belt by its other end on the vehicle wall when not in use.

When the gas bag is spread out, the narrow ends of the gas bag can lie next to each other at a distance, be inclined relative to each other, or be arranged behind each other. In the first two mentioned cases the gas bag when spread out has a shape similar to a horseshoe wherein the centre area is substantially wider than the ends. In the case where the ends are arranged behind each other, these ends and the gas bag have either a substantially common axis, or the axes of the ends and of the gas bag are approximately at a right angle to each other.

The gas bag can have different shapes, e.g. a fan, cushion, circular, lens, trapezoidal, or bone shape. Particularly, for the protection of the driver, it is expedient to use a fan or bone shaped gas bag so that as the gas bag unfolds from below it does not press the arms to the side so that the hands can no longer hold the steering wheel.

In a further design, the gas bag has at least one partition provided with apertures to form a multi-chamber airbag whereby the base surface of the partitions corresponds to the shape of the inflated gas bag. It is thereby possible to unfold certain sections of the gas bag with a time delay. The same effect can also be achieved if the gas bag is divided by at least one seam into several chambers that communicate with each other. The gas bag thereby has in the inflated state a surface structure that is like an air mattress.

For the additional tautening of the gas bag in the inflated state, at least one band or cord can run loose in and along the outer edge of the spread-out gas bag whereby one end of the band is fixed inside the gas bag and the other end is fixed outside of the gas bag.

In a further design, at least one additional gas bag is provided that unfolds in a different direction from the main gas bag. Thus, for example, an additional gas bag can be provided that extends into the foot area or into the head area.

Preferably, the detachable end of the gas bag has a locking unit that can engage in a lock and in which the end of the gas bag runs as a flat strip. The locking unit can be formed according to that of a belt.

The end of the gas bag on the side of the gas generator is preferably fixed on a supply line or a diffuser pipe on or in which a gas generator is provided. In a further design, it is proposed that the area of the gas bag on the gas generator side sits on a supply line end pipe and is enclosed there by a first holder part, that the end of the gas bag is inserted over the holder part and is enclosed by at least a second holder part, wherein the first and second holder parts adjoin one another next to the supply pipe or diffuser pipe, are connected together there, and are connectable with the vehicle.

In a further embodiment, the area of the gas bag on the gas generator side sits on a supply end pipe and is enclosed by a wedge ring. The end of the gas bag is inverted over the wedge ring and is enclosed by a clamping part provided with an inner cone.

In a further embodiment, the gas generator is fixed in a diffuser pipe on the motor vehicle and is connected by a curved, flexible, or rigid supply pipe to a supply line end pipe running inclined upwards towards the front and on which is fixed the end of the gas bag on the gas generator side.

BRIEF DESCRIPTION OF THE DRAWINGS

The invention will now be explained with reference to the embodiments shown in the drawings in which:

FIG. 29 shows a side view of the generator side end of the gas bag.

FIG. 30 shows a section B—B through FIG. 29.

FIG. 31 shows a section C—C through FIG. 29.

FIG. 34 shows a cross-section through the holder of the generator-side end of the gas bag.

FIG. 35 shows a view of the holder according to FIG. 34.

FIG. 36 shows a longitudinal sectional view through the holder according to FIG. 35.

DETAILED DESCRIPTION

Figure 1:
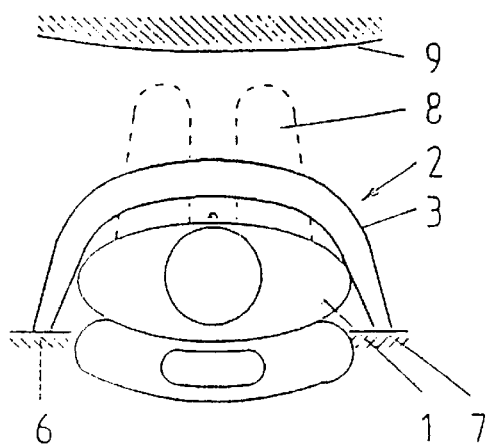
FIG. 1 is a diagrammatic plan view of a passenger with an airbag system according to one embodiment of the present invention.
Figure 2:
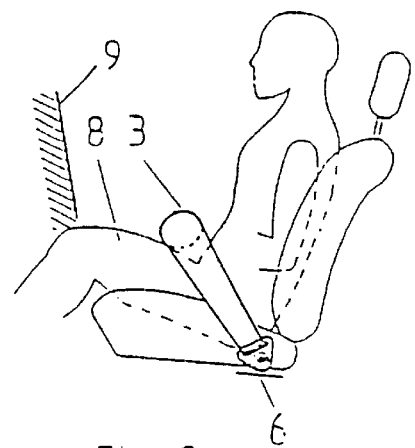
FIG. 2 is a side view of the passenger/airbag system according to FIG. 1.

In FIGS. 1 to 6 a passenger 1 is shown sitting in a motor vehicle. An airbag system 2 according to the invention is associated with the passenger. The airbag system is shown diagrammatically and has a folded gas bag 4 located in a cover 3 and fixed to fastening points 6, 7 on the motor vehicle on either side of the seat 5. In the folded state shown in FIGS. 1 and 2, the gas bag lies loose on the upper thighs 8 of the passenger. In this illustration, the passenger is located in a normal position, i.e., he has a relatively large distance from the other vehicle structure 9 in front of him, such as the steering wheel, dash board or backrest of the front seat.

Figure 3:
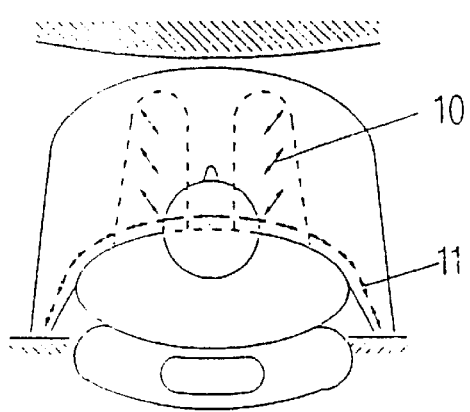
FIG. 3 is a plan view of the system according to FIG. 1 in a partially unfolded state.
Figure 4:
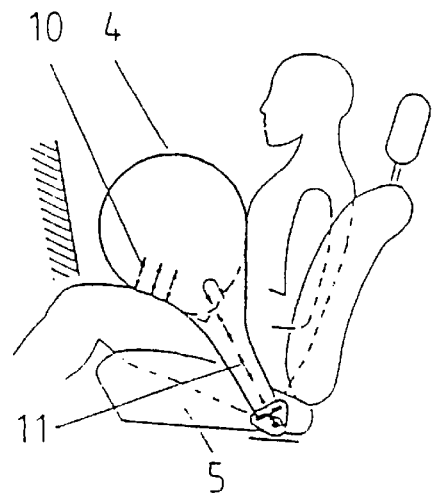
FIG. 4 is a side view of the system according to FIG. 3.

In the first state of unfolding as illustrated in FIGS. 3 and 4, the gas bag spreads out in the pelvic area of the passenger both towards his body and towards the vehicle structure. Already in this partially unfolded state, a decelerating action is exerted on the passenger. The decelerating action takes place by the tensile strain of the area of the gas bag adjoining the body of the passenger and by the support of the gas bag on the upper thighs. The gas bag thus has a compression area 10 and a traction area 11.

Figure 5:
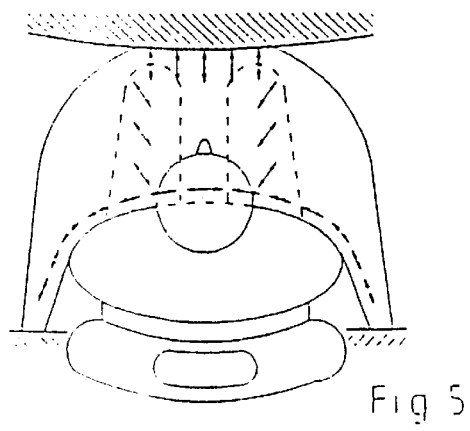
FIG. 5 shows the passenger/airbag system according to FIG. 1 in the fully unfolded state.
Figure 6:
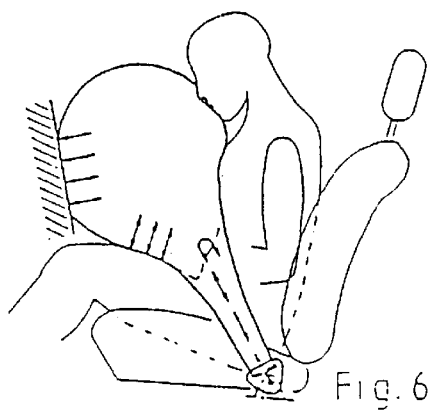
FIG. 6 is a side view of the system according to FIG. 5.

In this first stage of unfolding, the gas bag does not only act in the pelvic area on the passenger but immediately after reaching the passenger the gas bag rolls up on the upper body of the passenger, whereby the upper body is prevented from bending down, as occurs with a known belt airbag. When the gas bag fully unfolds, it is supported additionally on the vehicle structure 9 as shown in FIGS. 5 and 6.

The retention action of the airbag system according to the invention is thus achieved, in that the gas bag takes up both the compression and traction strains as a result of inflation. With a conventional lap belt airbag that also adjoins the body of the passenger in the inactivated state however, only compression strains are absorbed.

Figure 7A:
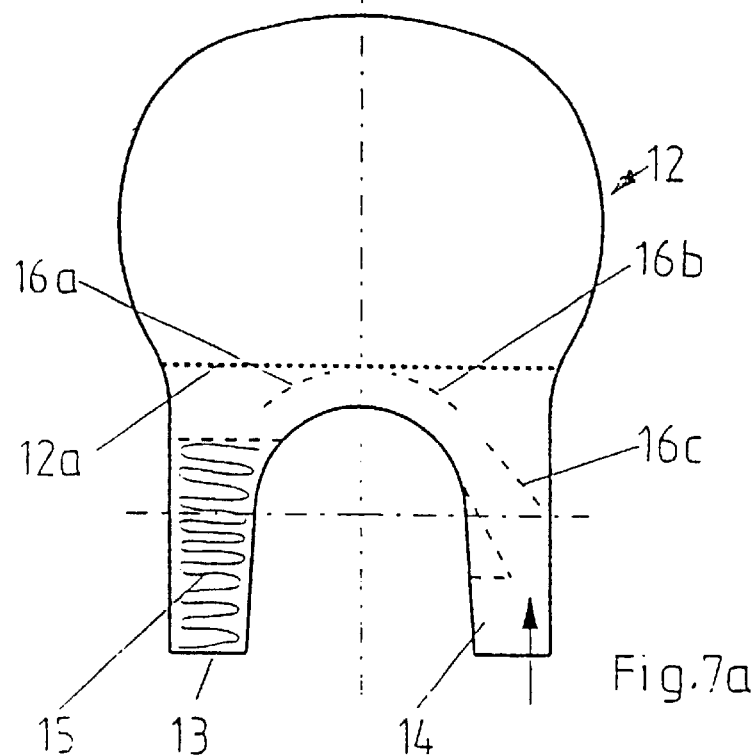
FIGS. 7a to 7c are plan views of gas bags with the ends lying side by side.

FIG. 7a shows an embodiment of a gas bag for the airbag system according to the present invention. The gas bag 12 has two spaced ends 13,14 side by side. One end 13 is thereby stitched flat through a seam 15. As will be explained later on in further detail, this end 13 is connectable to a lock so that the gas bag can be detached from the vehicle on this side similar to a belt. The other end 14 is tubular and, as explained in further detail below, is connected to a gas generator.

So that the gas is introduced correctly, tucks 16a to 16c are provided in the gas bag 12 one behind the other in a row whereby gaps are formed in between for the gas to enter into the gas bag. In the present embodiment, inserts (not shown) are provided in the area extending from the ends 13, 14 to the line 12a in order to reinforce the section of the gas bag that is subjected to tensile strain.

Figure 7B:
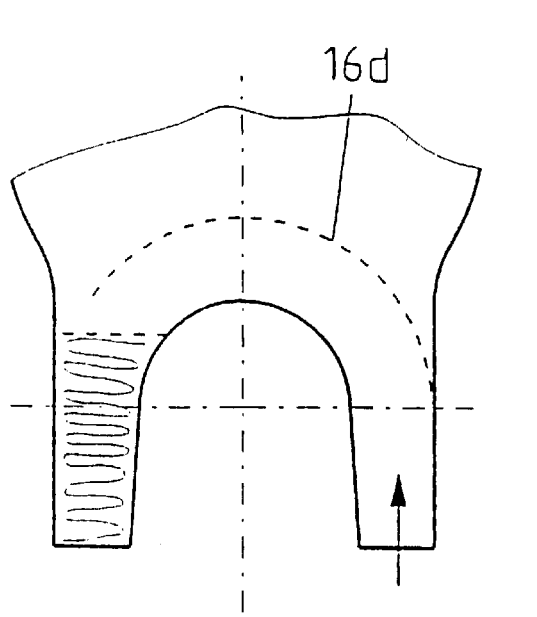

FIG. 7b shows an embodiment with a continuous tuck 16d which runs in a curve to the left starting from the right hand edge of the gas bag and ends at a distance from the left edge of the gas bag. In this embodiment, the gas enters on the right hand side into the lower section of the gas bag, is directed to the left hand side, and then enters there the remaining area of the gas bag.

Figure 7C:
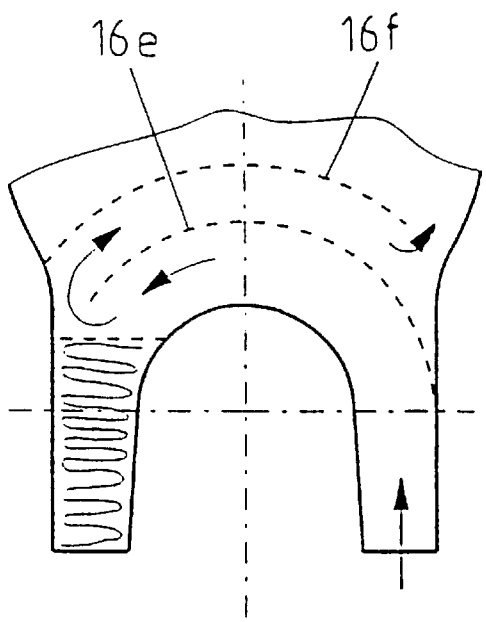

FIG. 7c shows an embodiment wherein two tucks 16e and 16f are provided side by side, wherein the tuck 16e runs like the tuck 16d in FIG. 7b whilst the tuck 16f runs from the left hand edge of the gas bag to the right and ends there at a distance from the right hand edge of the gas bag. The gas is therefore directed zig zag fashion from the lower area of the gas bag into this remaining area.

Figure 8:
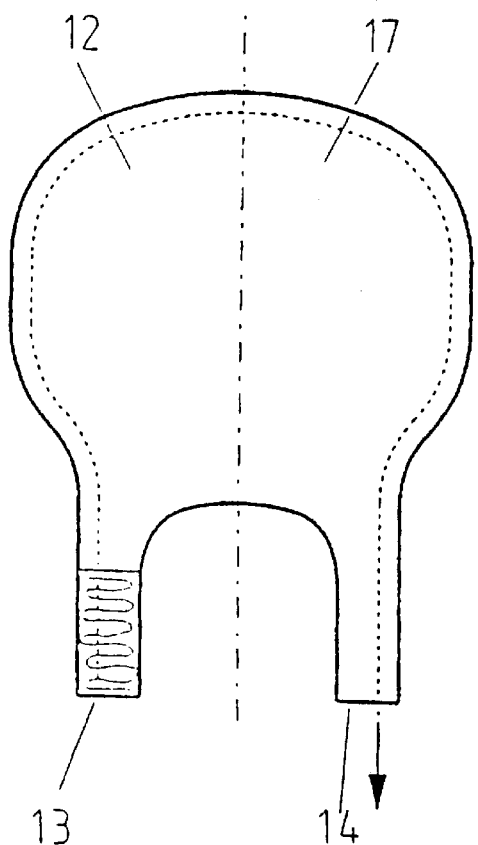
FIG. 8 shows a gas bag with the ends lying side by side and with a band or cord for tautening the inflated gas bag.

With the embodiment of FIG. 8, a cord or band 17 is stitched in on the outer edge of the spread-out gas bag and can be pulled to exert tensile force. An additional tautening of the inflated gas bag can thereby be achieved and the unfolding direction of the gas bag can be influenced. The band is fixed at the flat end 13 in the gas bag, is passed out of the gas bag at the other end 14 and is fixed on a component part of the motor vehicle.

Figure 9:
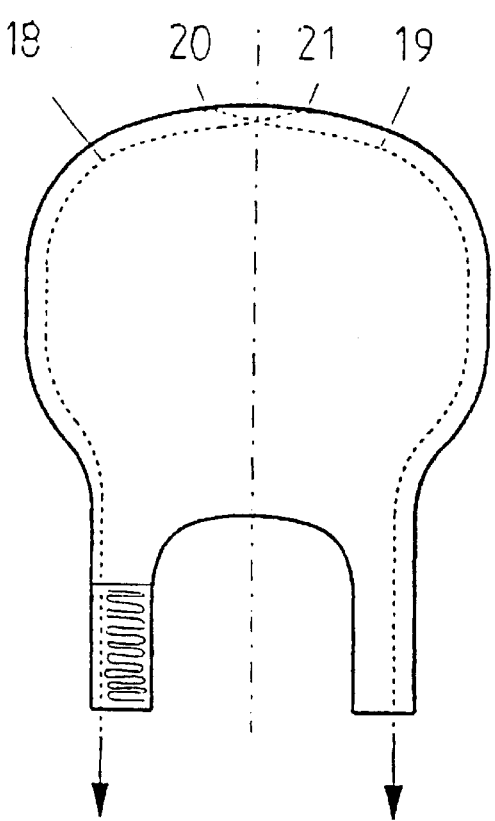
FIG. 9 shows a gas bag with the ends lying side by side and with two bands or cords for tautening the inflated gas bag.

In the embodiment of FIG. 9 two crossed cords or bands 18, 19 are provided which are not connected together at the intersecting points. Rather, the ends 20, 21 are connected to the gas bag 12. The other ends of the bands 18, 19 are guided out from the gas bag. With this embodiment, a pull can be exerted on either side in a way similar to jogging trousers. The actions obtained are similar to those in the embodiment previously described.

Figure 10:
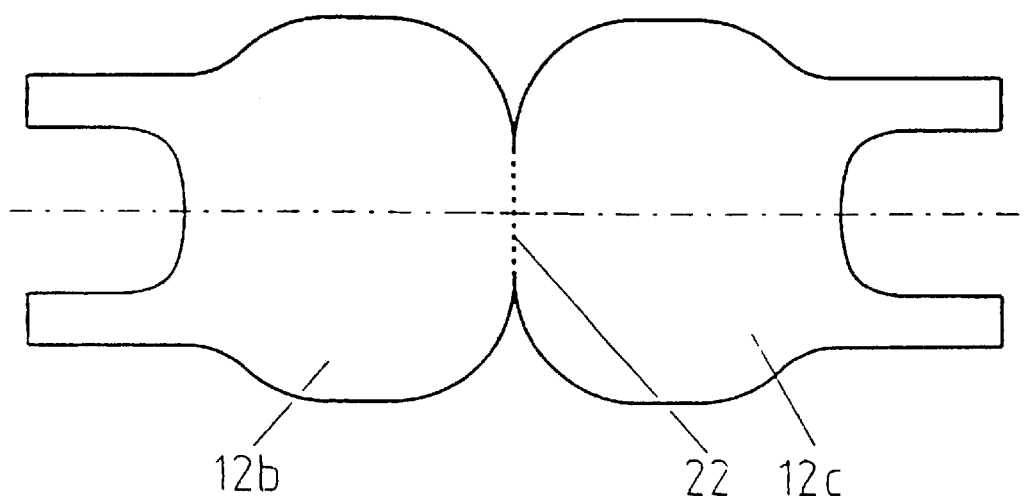
FIG. 10 shows a one-piece blank for a gas bag according to FIG. 7.
Figure 11:
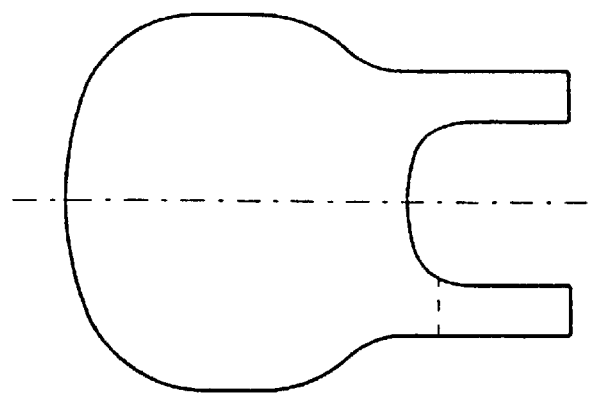
FIG. 11 shows a one-piece woven gas bag according to FIG. 7.

FIGS. 10 and 11 show examples for manufacturing the gas bag. In the embodiment of FIG. 10, a one-piece blank is shown for the gas bag. The two parts 12b and 12c of the gas bag are placed on each other over a common edge 22 and stitched together.

In the embodiment of FIG. 11, the gas bag is woven as one piece in the form illustrated. The end on the lock side is thereby woven together and can then be stitched flat. The end on the side of the generator is then attached to same.

Figure 12:
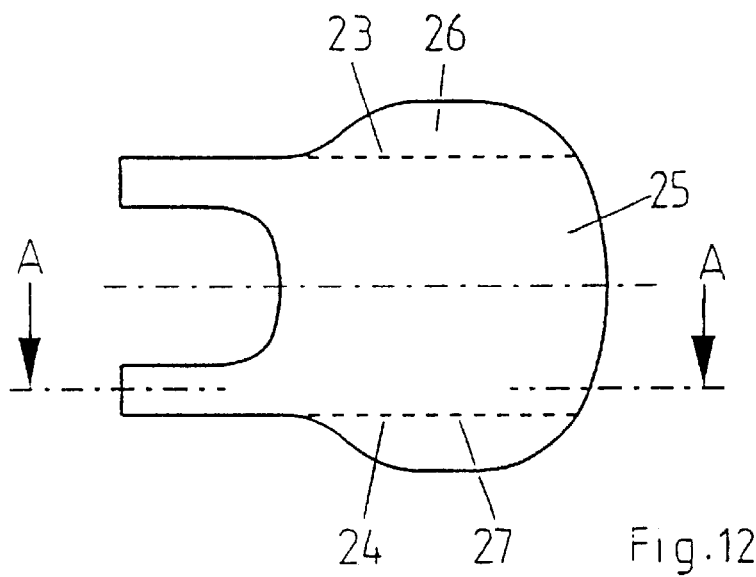
FIG. 12 shows a plan view of a multi-chamber gas bag.
Figure 13:
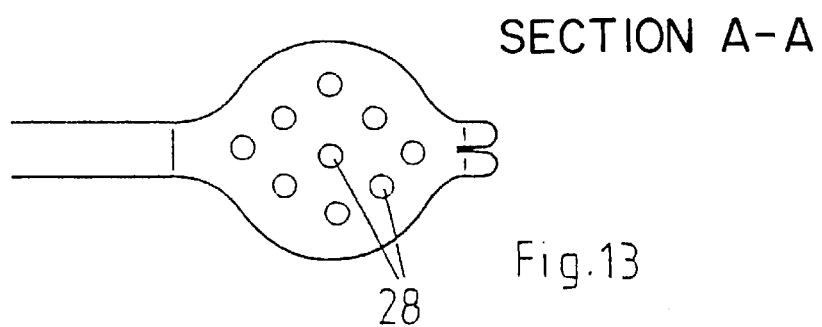
FIG. 13 shows a section through the gas bag according to FIG. 12.

FIGS. 12 and 13 show an embodiment having a multi-chamber gas bag. The multi-chamber gas bag has partition walls 23, 24 that run roughly parallel to the ends of the gas bag. The gas bag is thereby divided into a main chamber 25 and two secondary chambers 26 and 27. The partition walls have apertures 28 through which the gas can enter from the main chamber into the secondary chambers. The partition walls are flexible so that they do not impair the folding of the gas bag. With this embodiment, gas bag inflation is delayed in the area of the secondary chambers.

Figure 14:
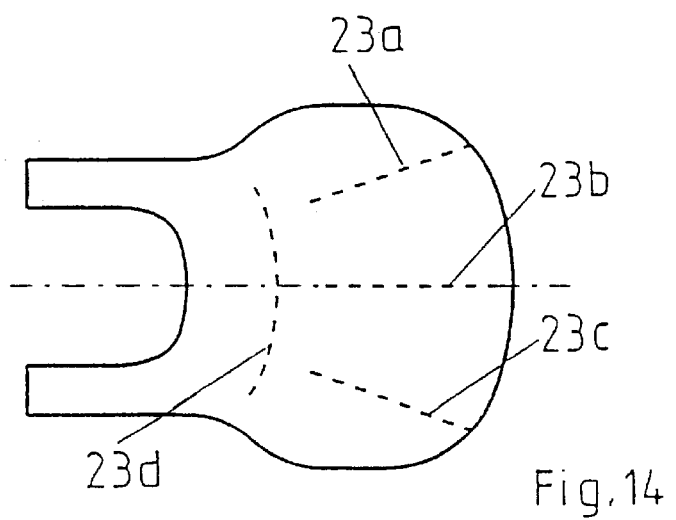
FIG. 14 shows an additional embodiment of a multi chamber gas bag.

FIG. 14 shows an embodiment having a multi chamber gas bag divided by several seams 23a to 23d into several chambers that communicate with each other. The gas bag thereby has in the inflated state an air mattress type of surface structure.

Figure 15:
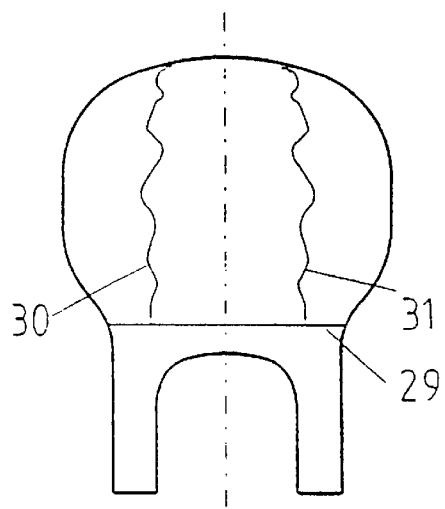
FIG. 15 shows a gas bag according to FIG. 7 with arrester straps.
Figure 16:
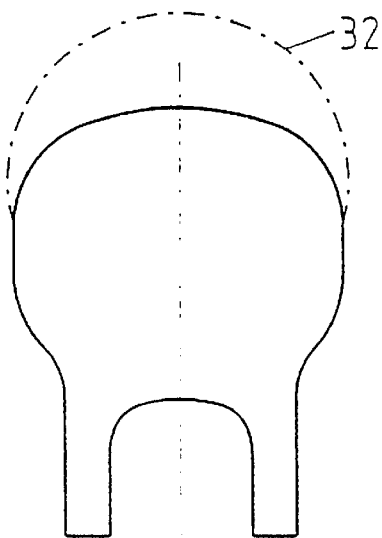
FIG. 16 shows a gas bag with additional head protection.

In the embodiment shown in FIG. 15 arrester straps 30, 31 are provided between a strip 29 running across the ends 13, 14 and the opposing ends of the gas bag, to act in the same way as in known gas bags.

Figure 17:
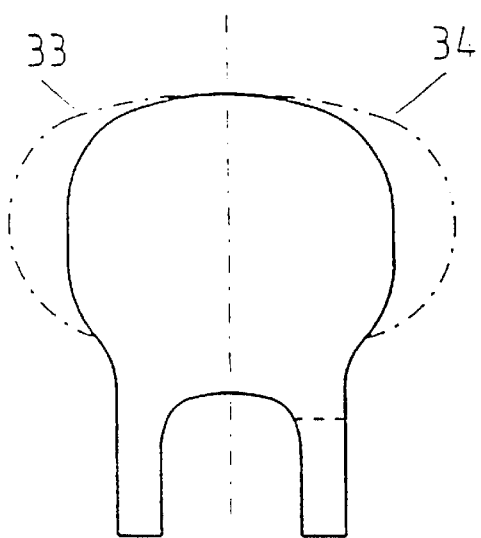
FIG. 17 shows a gas bag with additional side protection.
Figures 18, 19:
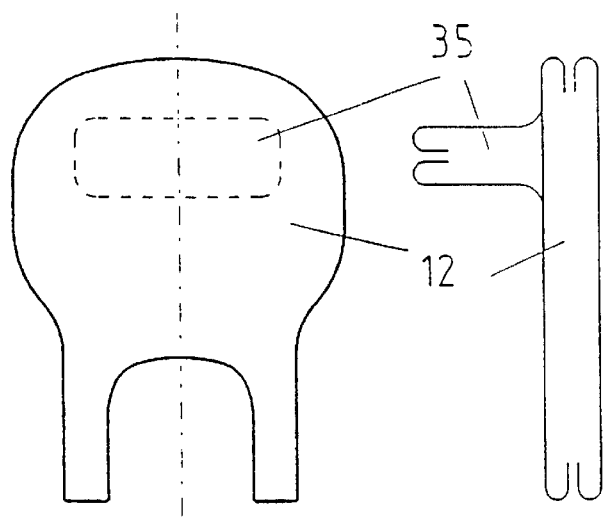
FIG. 18 shows a gas bag with additional protection for the foot or head area.
FIG. 19 shows a side view of the gas bag according to FIG. 18.

FIGS. 16 to 19 show modifications of the basic form of the gas bag. The forms shown in dotted lines can be both additional chambers of a multi chamber gas bag and the expanded contours of a single chamber gas bag. In the embodiment shown in FIG. 16, the gas bag is enlarged along a contour 32 specifically to protect the head. In the embodiment of FIG. 17 the gas bag is widened out either to the left or right along contours 33 or 34. In the embodiment of FIGS. 18 and 19 the gas bag has an additional gas bag 35 that extends perpendicularly away from the gas bag 12 from one side thereof. Depending on the position of this side in the motor vehicle this additional gas bag 35 acts as a foot or head space bag.

Figure 20A:
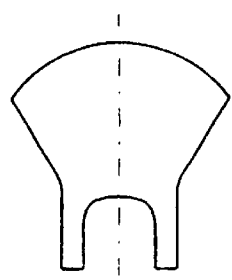
FIGS. 20a to 20h show different forms of the gas bag in plan view.
Figure 20B:
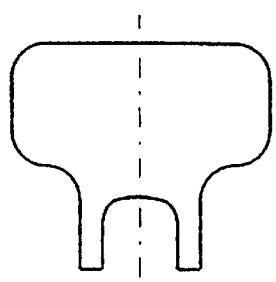
Figure 20C:
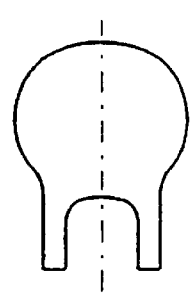
Figure 20D:
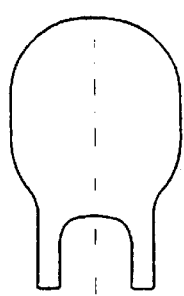
Figure 20E:
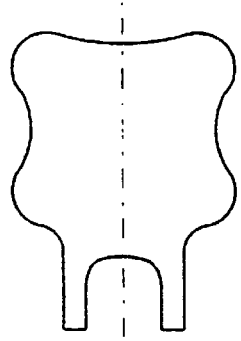

Different forms of the gas bag are shown in FIGS. 20a to 20h. As embodiments with ends lying side by side FIG. 20a shows a fan-shaped gas bag, FIG. 20b a cushion shape, FIG. 20c a circular shape, FIG. 20d a lens shape and FIG. 20e a bone shape.

Figure 20I:
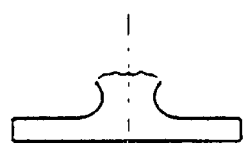
FIGS. 20i and 20j show embodiments of the ends of the gas bag.
Figure 20J:
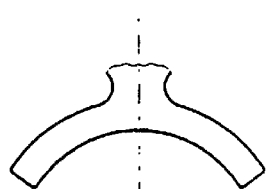
Figure 20F:
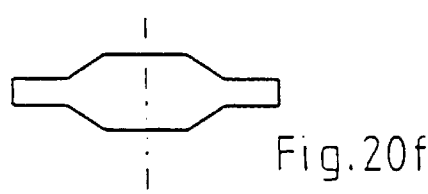
Figure 20G:
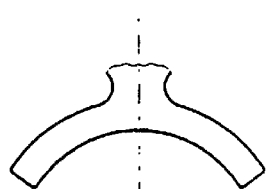
Figure 20H:
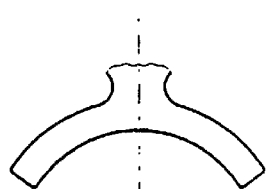

With the embodiment of FIGS. 20f to 20h the ends of the relevant gas bag are not arranged next to each other, like the previous embodiments, but are arranged one behind the other wherein the ends and the gas bag have substantially a common axis. The gas bag with its associated ends thus has the basic shape of a tubular hose wherein the gas bag of FIG. 20f runs trapezoidal towards the ends, FIG. 20g shows a cushion shaped gas bag and FIG. 20h a lens shaped gas bag.

FIG. 20i likewise shows an embodiment where the ends lie one behind the other wherein here their axis and the axis of the gas bag form at least approximately a right angle. In the embodiment of FIG. 20j two ends are provided inclined relative to each other. The embodiments of the ends of FIGS. 20i and 20j can be used with all the forms of gas bags described previously.

Figure 21:
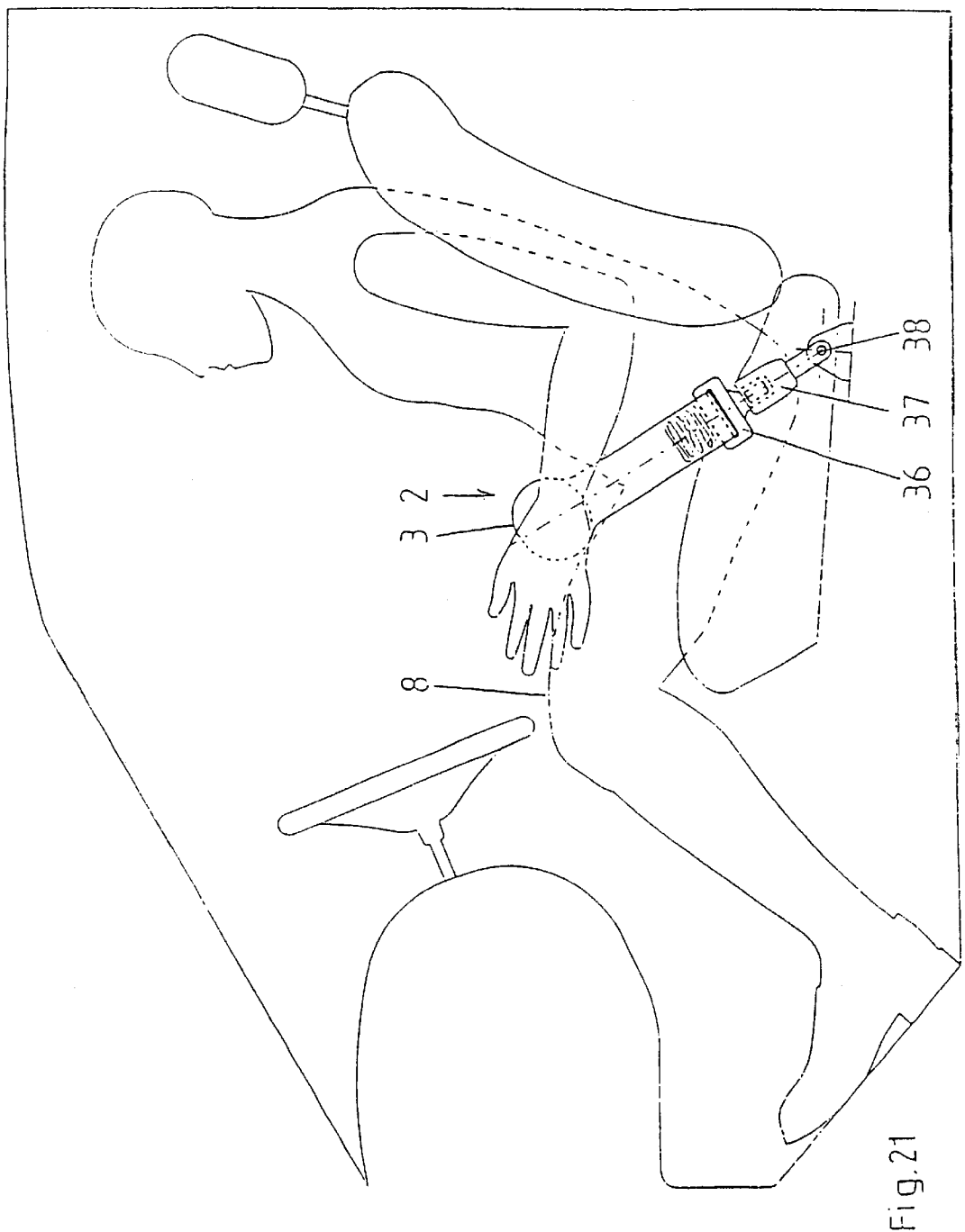
FIG. 21 shows a side view of the lock side of the airbag system according to one embodiment of the present invention in the inactivated state of the gas bag.
Figure 22:
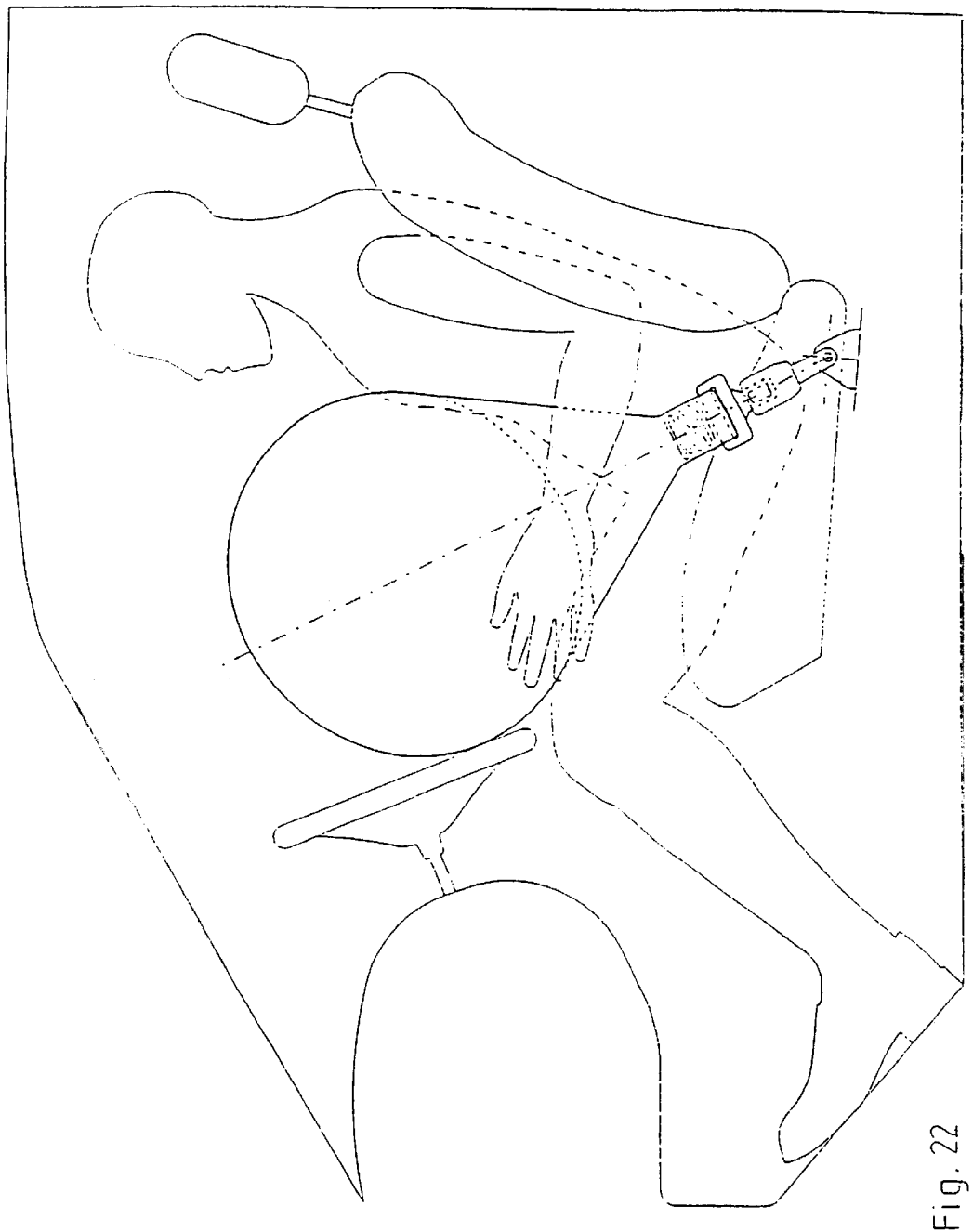
FIG. 22 shows the system according to FIG. 21 with an unfolded gas bag.

FIG. 21 shows in detail the lock side of the airbag system 2, on the example of the passenger seat. As already shown in FIG. 2 the airbag system 2 lies with the gas bag folded in the cover 3 loose on the upper thighs 8 of the passenger. The gas bag is fixed by one end on a locking unit 36 that can be inserted in a lock 37. The lock is connected to the motor vehicle at a fastening point 38. FIG. 22 shows the arrangement of FIG. 21 with an unfolded gas bag. The action corresponds to the action explained in connection with FIG. 6.

Figures 23, 24:
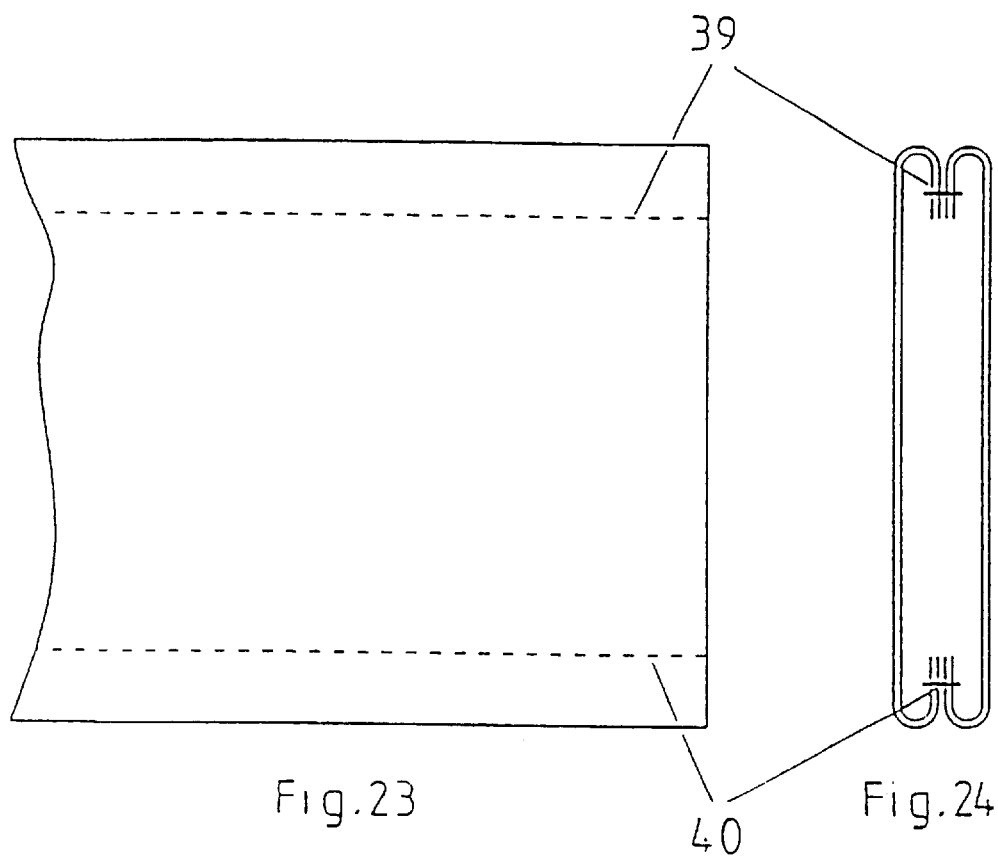
FIG. 23 shows a side view of the lock-side end of the gas bag.
FIG. 24 shows a cross-section of the lock-side end according to FIG. 23.
Figure 25:
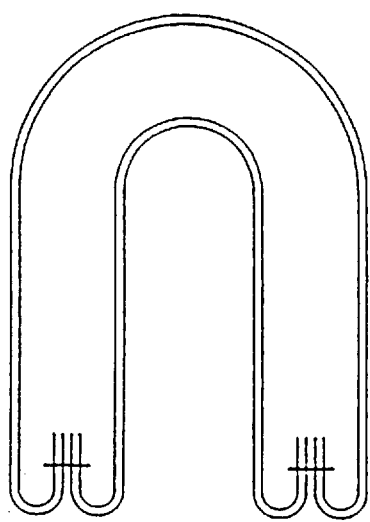
FIG. 25 shows the lock-side end according to FIG. 23 collapsed for installation in a locking unit.
Figure 26:
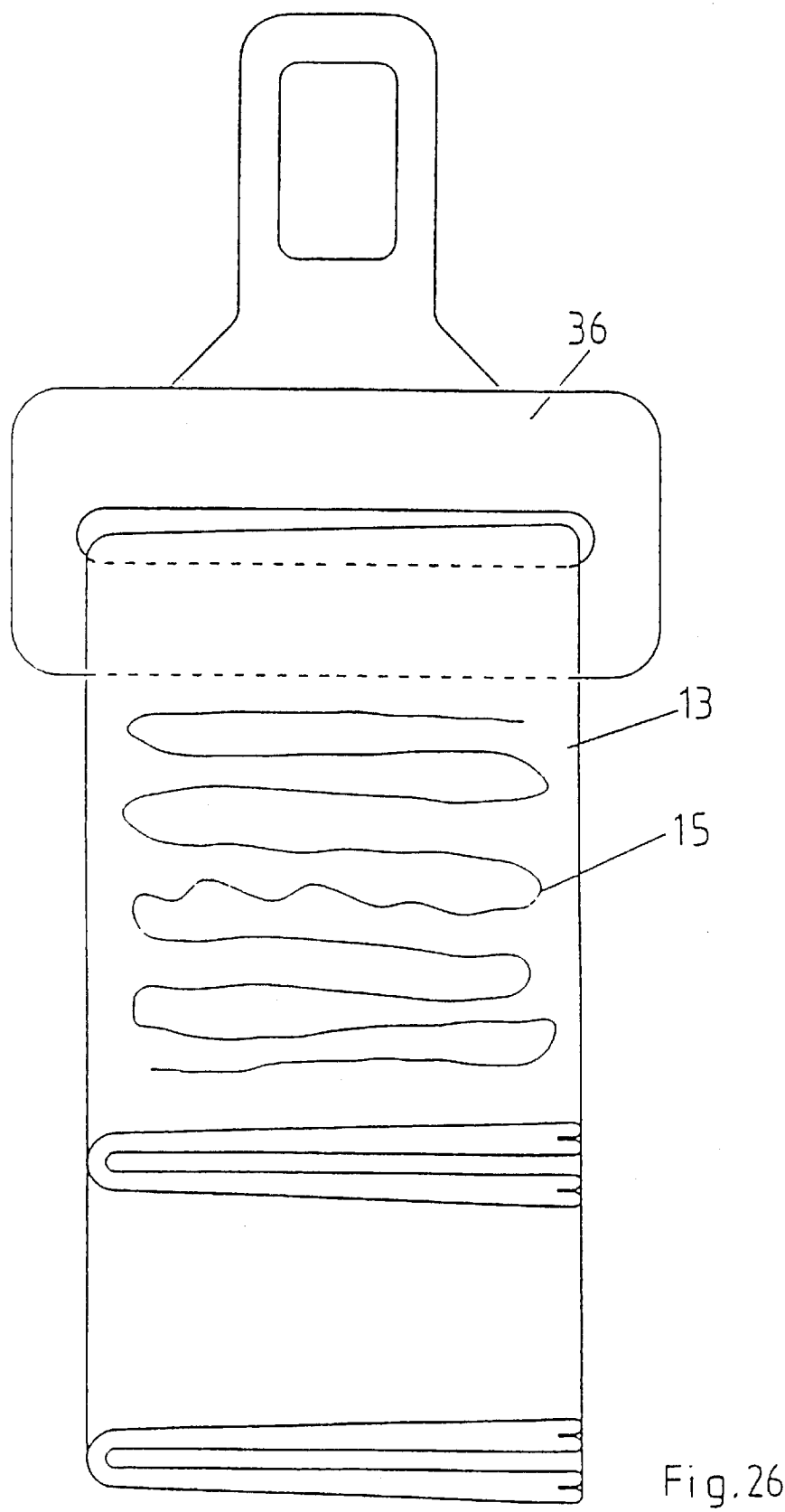
FIG. 26 shows the lock-side end of the gas bag connected to the locking unit.

FIGS. 23 and 24 show the lock-side end 13 of the gas bag 12 wherein the superposed sides are connected together by seams 39, 40. To connect with the narrower locking unit 36 the end is drawn up in the manner shown in FIG. 25 and connected in this position to the locking unit 36 (FIG. 26). The gathered sections are in turn connected together by the seam 15.

Figure 27:
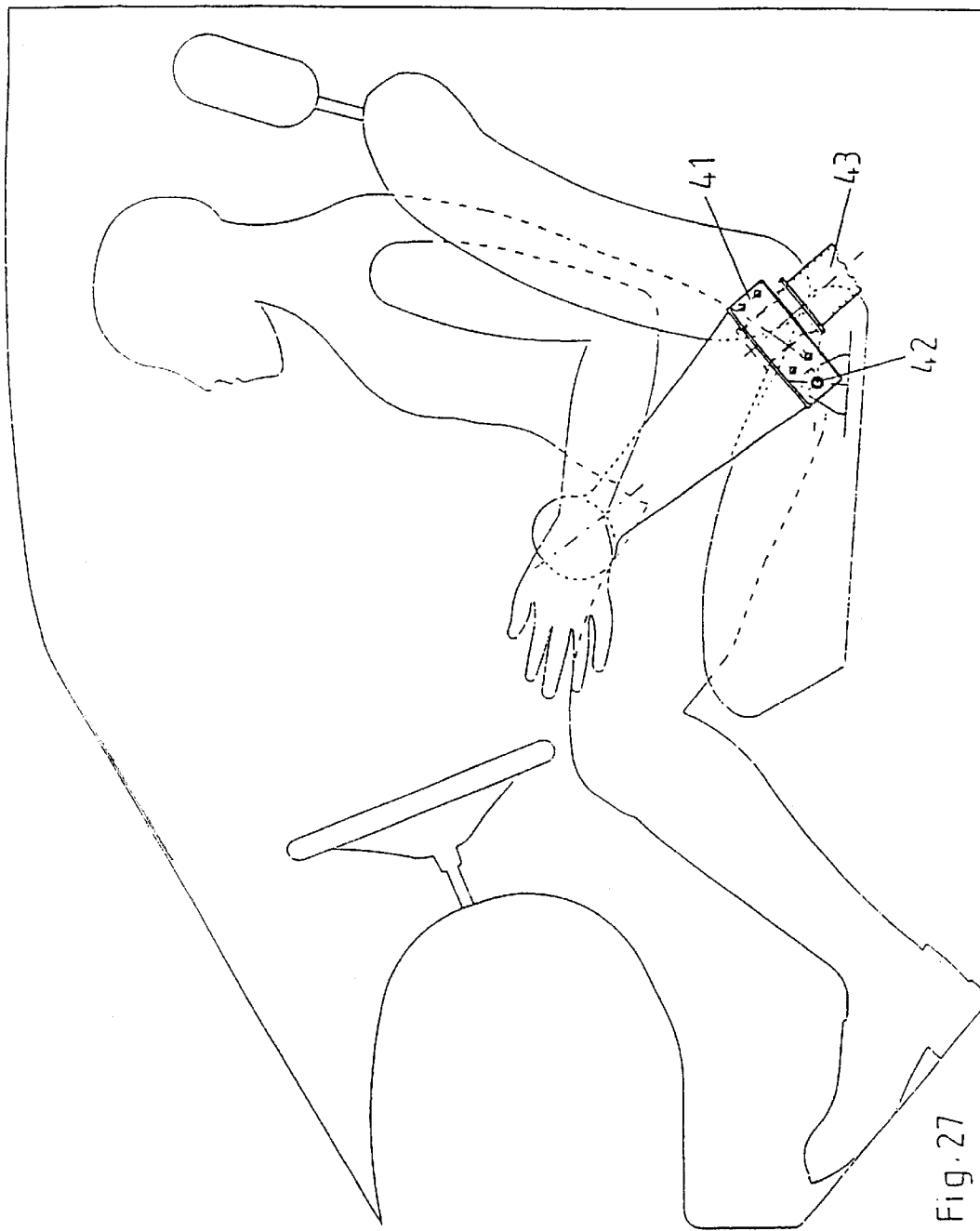
FIG. 27 shows a side view of the generator side of the airbag system in the inactivated state of the gas bag.
Figure 28:
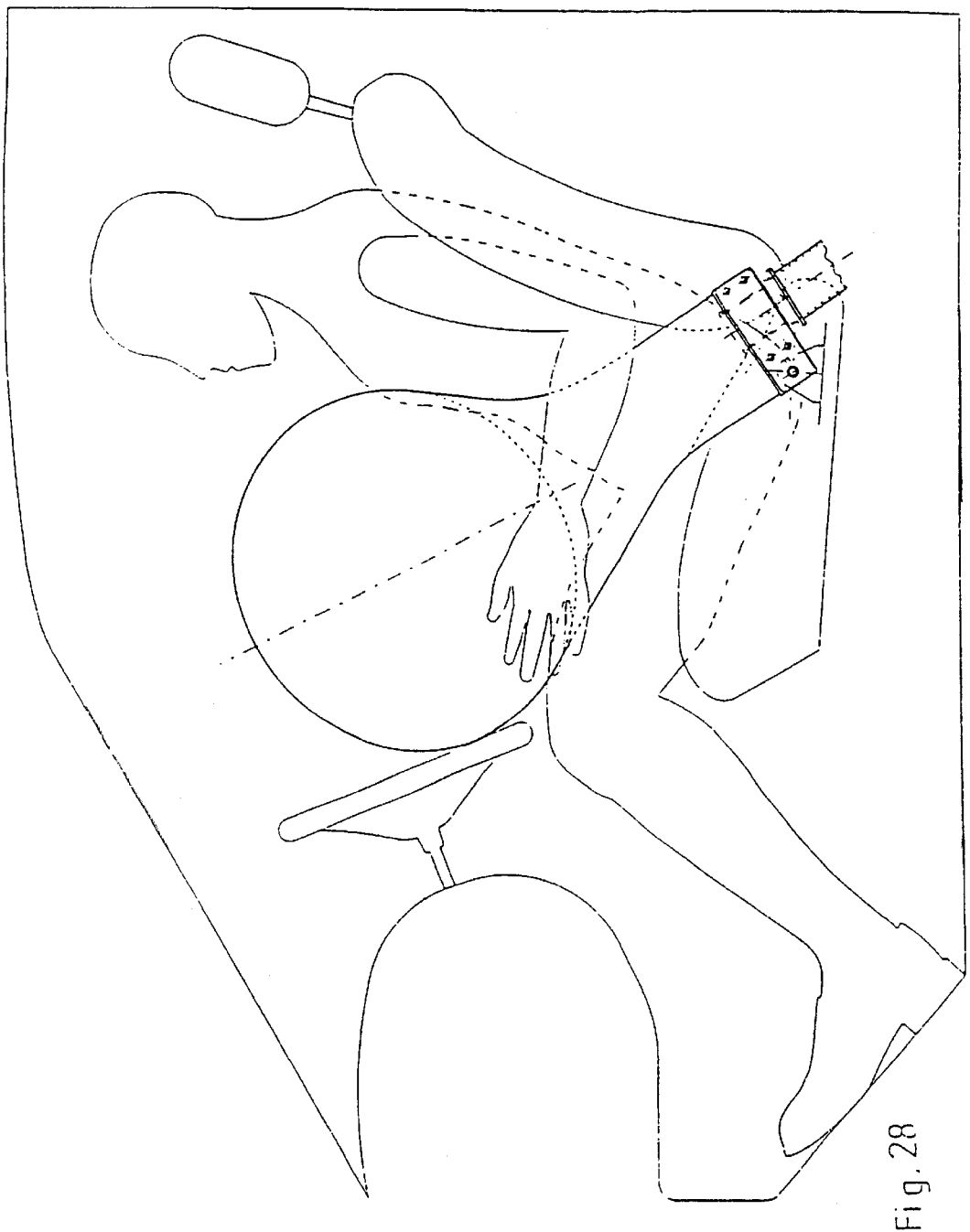
FIG. 28 shows the system according to FIG. 27 with an unfolded gas bag.
Figure 33:
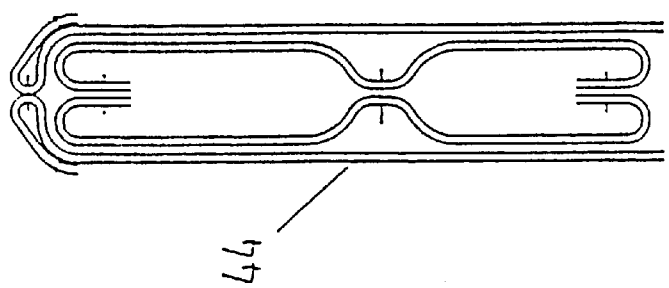
FIG. 33 shows a view of the inverted end according to FIG. 32.
Figure 32:
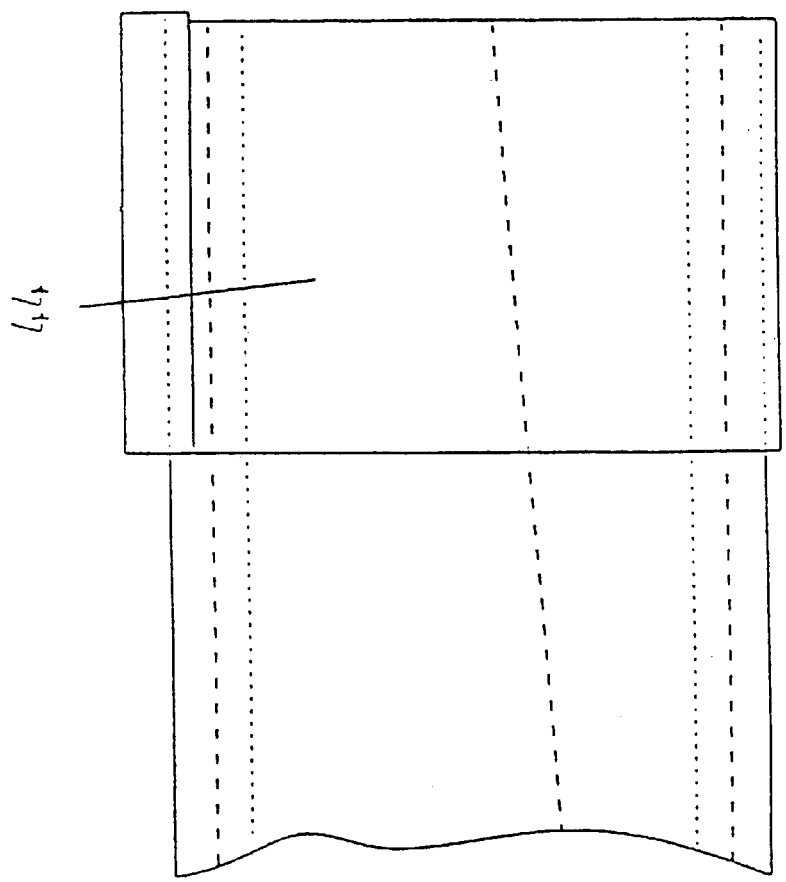
FIG. 32 shows a side view of the inverted end according to FIG. 29.

FIG. 27 shows in detail the generator side of the airbag system 2 on the example of the driver seat. The gas bag is fixed in a holder 41 which in turn is connected to the motor vehicle at a fastening point 42. A supply pipe 43 leading to the gas generator (not shown in this FIG.) is fixed on the holder 41. FIG. 28 shows the inflated gas bag from the view of FIG. 27.

FIGS. 29 to 33 show the generator side end 14 of the gas bag 12 wherein the superposed sides are likewise connected together by the circumferential seams 39, 40. Furthermore, a tuck 16 is provided that reduces the receiving opening of the end 14 to the size required for the supply pipe 43. The outermost section of the end 14 is inverted outwards for fitting on the holder 41 so that the end 14 has the shape shown in FIGS. 32 and 33 with an inverted section 44.

FIGS. 34 to 36 show the end 14 of the gas bag mounted in the holder 41. The supply pipe 43 extends into the gas bag. The holder has an inner sheet metal part 45 as a first retaining part which extends between the end 14 and the inverted section 44 and engages round the end 14 and the supply pipe 43. The sheet metal part 45 is compressed above the supply pipe 43 so that the upper section of the end 14 is clamped there. The ends are compressed underneath the supply pipe and there clamp the lower section of the end 14. The inverted section 44 is enclosed by two outer sheet metal parts 46, 47 as second holding parts. The outer sheet metal parts are screwed from above and below to the inner sheet metal part 45 lying in between and thereby also clamp the inserted section 44. A bolt 48 is provided in the sheet metal parts 45, 46, 47 that adjoin one another at the bottom and the bolt forms there the fastening point 38 mentioned in general before. The airbag system is connected by this bolt through an attachment 49 to the motor vehicle, e.g. to the seat, the floor or the side trim.

Figure 37:
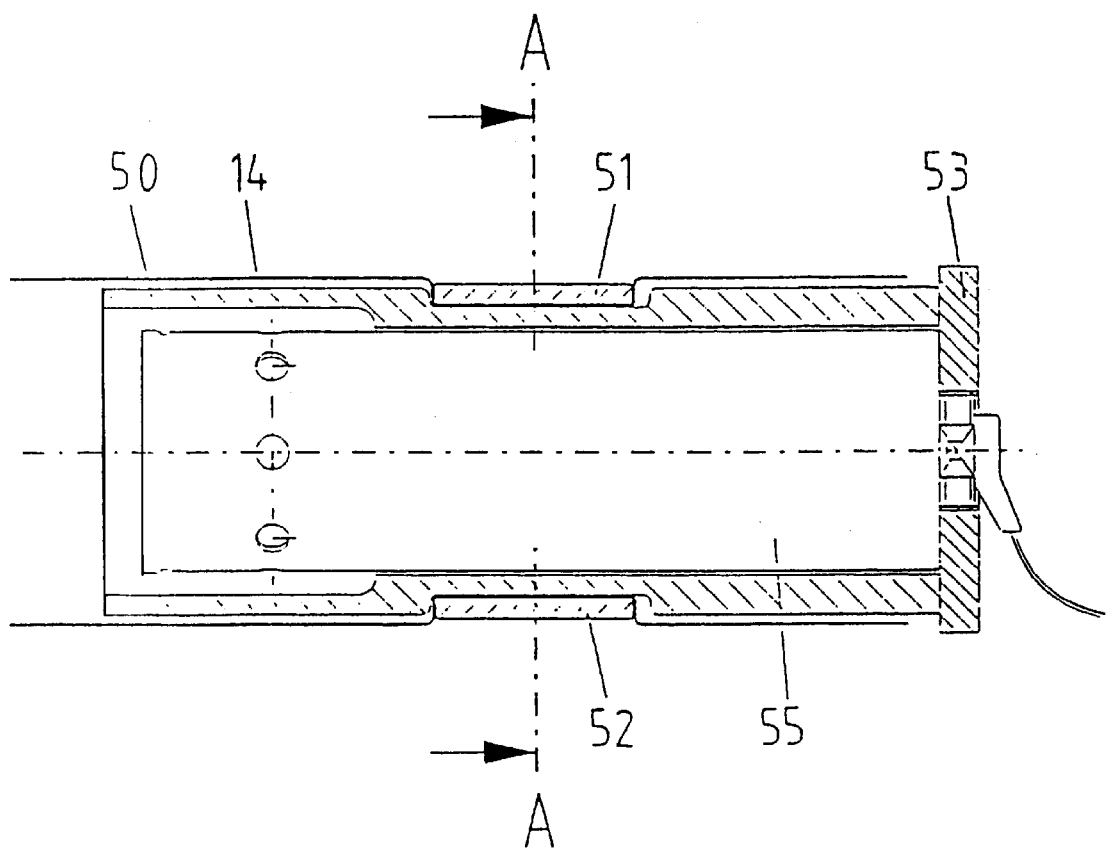
FIG. 37 shows an additional embodiment of the holder of the generator-side end of the gas bag.
Figure 38:
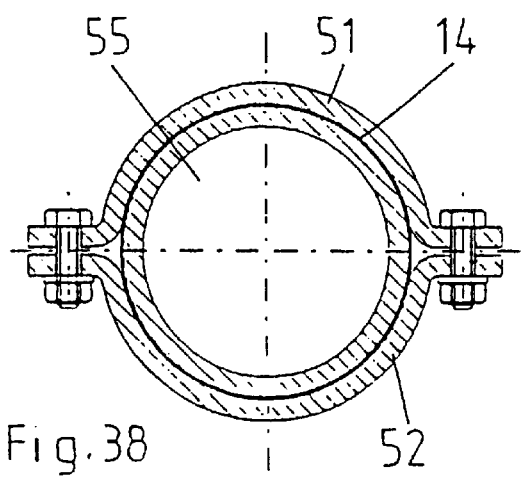
FIG. 38 shows a cross-section through the holder according to FIG. 37.

A second embodiment for fastening the gas bag at the generator-side end is shown in FIGS. 37 and 38. There, the end 14 of the gas bag has been drawn over a diffuser pipe 50 and is clamped in its middle centre by clips 51, 52. The end of the diffuser pipe projecting out of the gas bag is connected to a fastening part 53 for fixing on the vehicle in a similar way to the embodiment of FIG. 43. A tubular gas generator 55 is provided inside the diffuser pipe.

Figure 39:
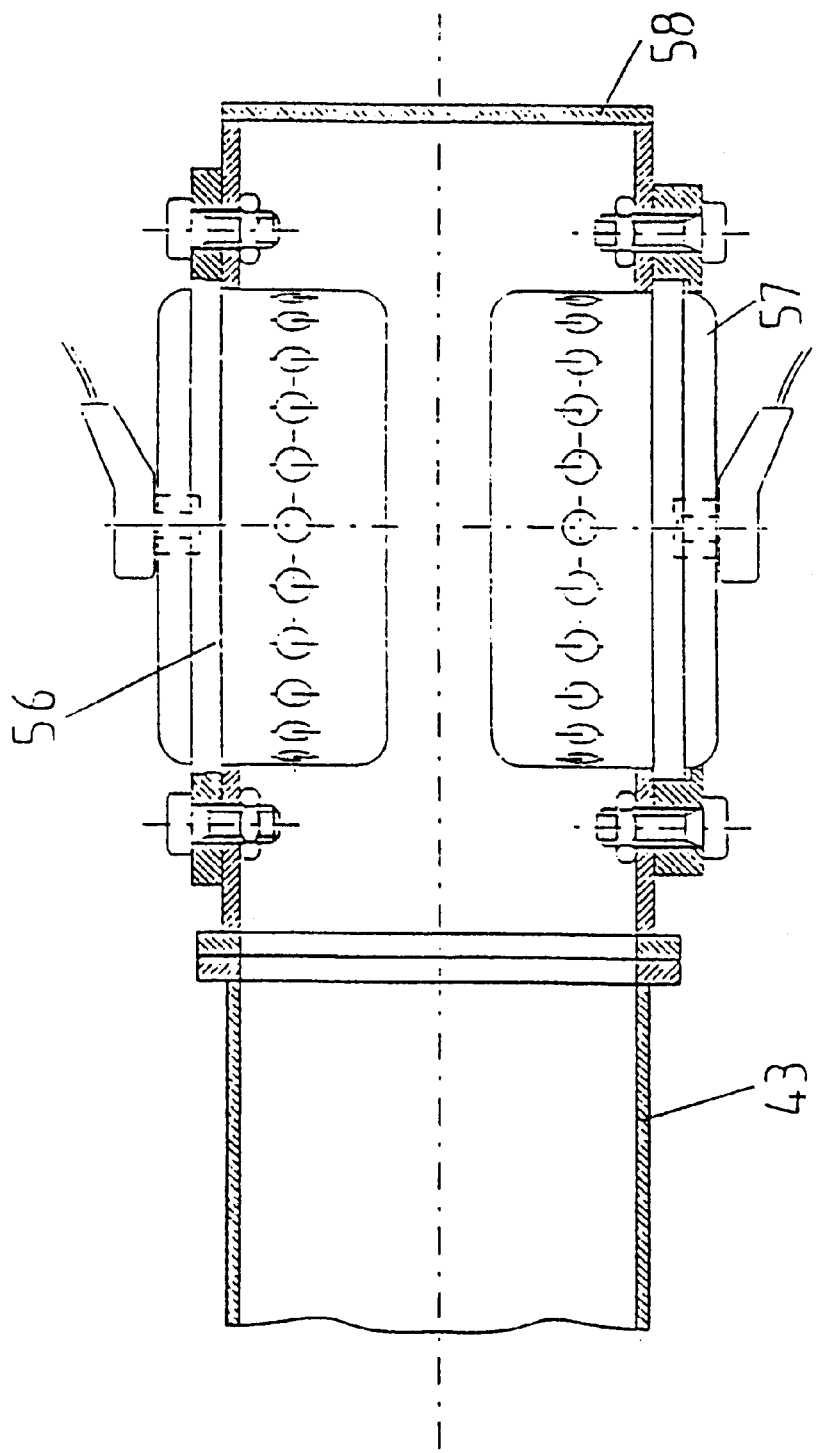
FIG. 39 shows the generator side of the airbag system with two opposite pot-shaped generators.
Figure 40:
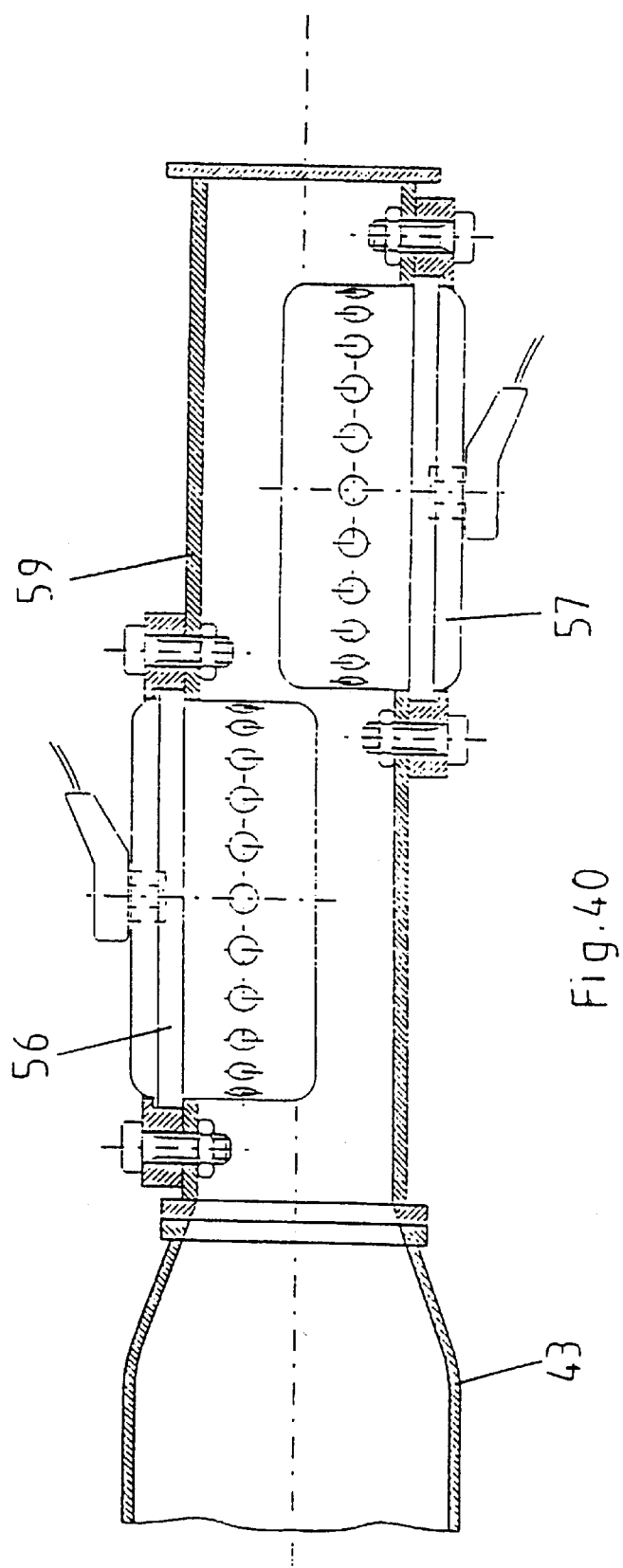
FIG. 40 shows the generator side of the airbag system with two pot-shaped generators off-set relative to each other.
Figure 41:
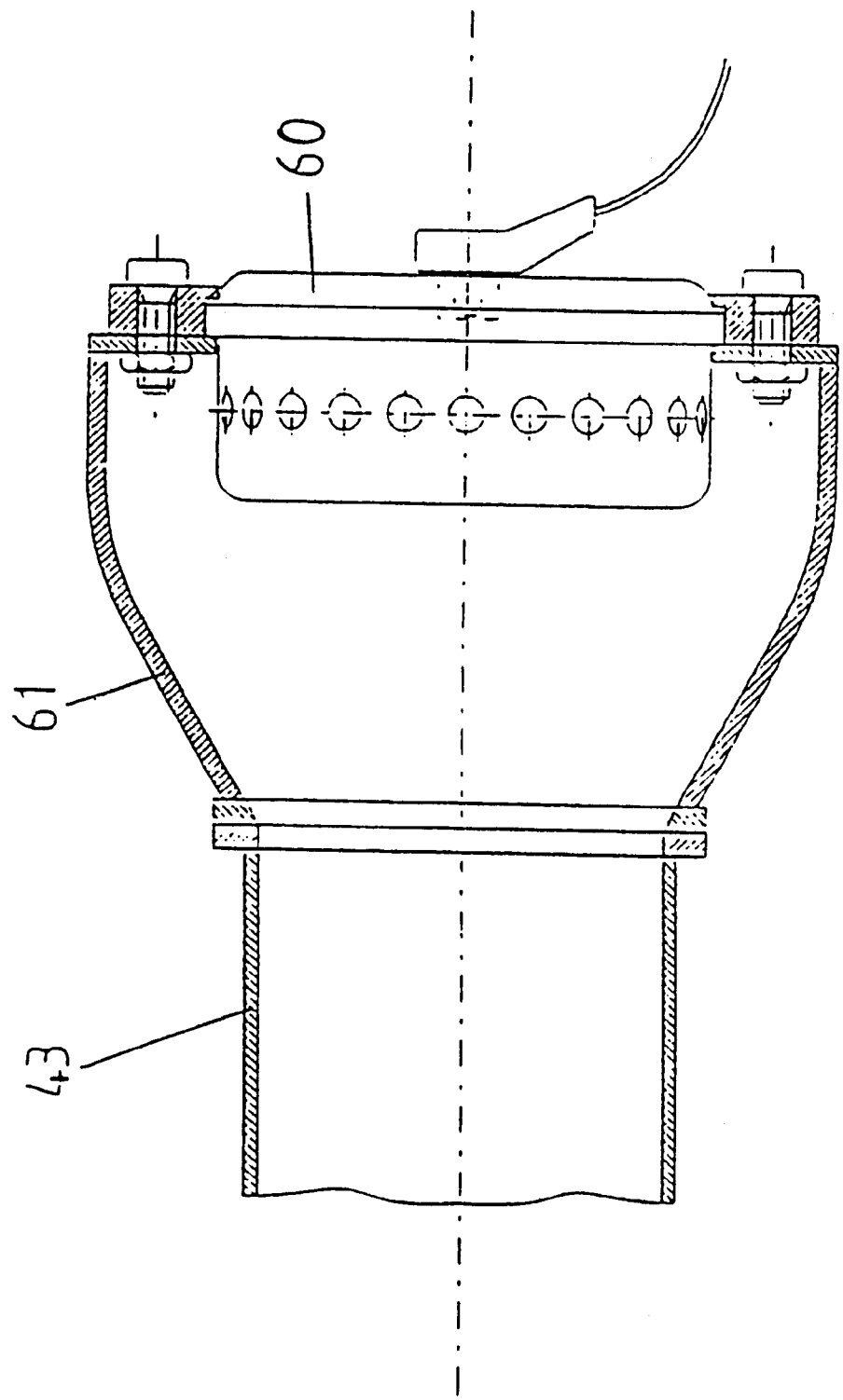
FIG. 41 shows the generator side of the airbag system with a pot-shaped generator.

FIGS. 39 to 41 show different embodiments with at least one pot-shaped generator, as used in driver airbags. Thus in the embodiment of FIG. 39 two pot-shaped gas generators 56, 57 are mounted opposite one another in a housing 58. The supply pipe 43 is flanged on the housing 58. With the embodiment of FIG. 40 two pot-shaped gas generators 56, 57 are arranged off-set opposite one another whereby a housing 59 can be made lower to accommodate same. With the embodiment of FIG. 41 only one pot-shaped gas generator 60 is mounted in a housing 61.

Figure 42:
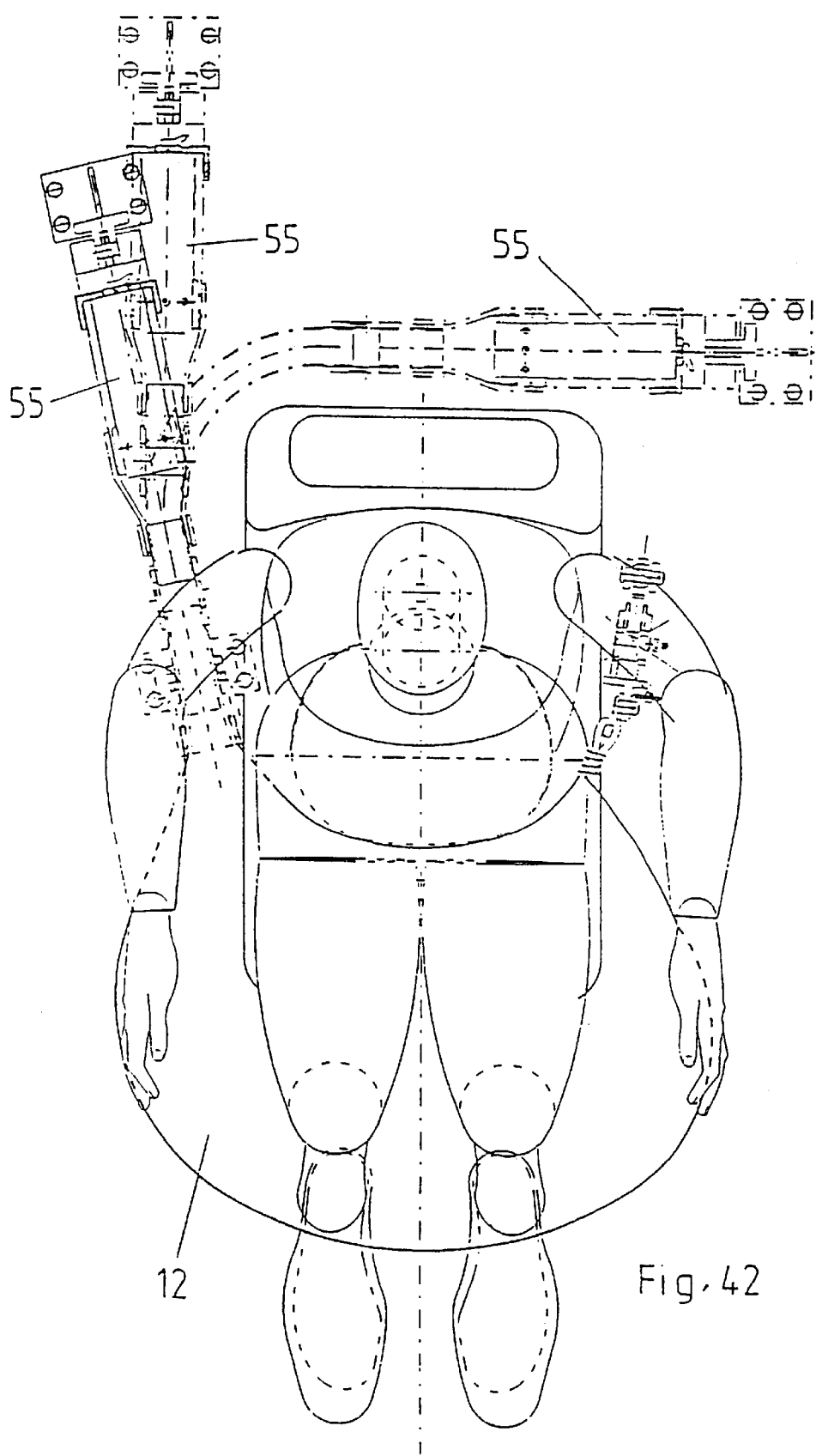
FIG. 42 shows a plan view of the airbag system with passenger and different fastening sites of the generator side of the airbag system in the vehicle.

Some possible fastening sites for the generator side of the airbag system in the vehicle can be seen from the plan view of FIG. 42 of the airbag system with passenger. One design is shown with a tubular gas generator 55 with a fully inflated gas bag. The tubular gas generator is shown in three different positions.

Figure 43:
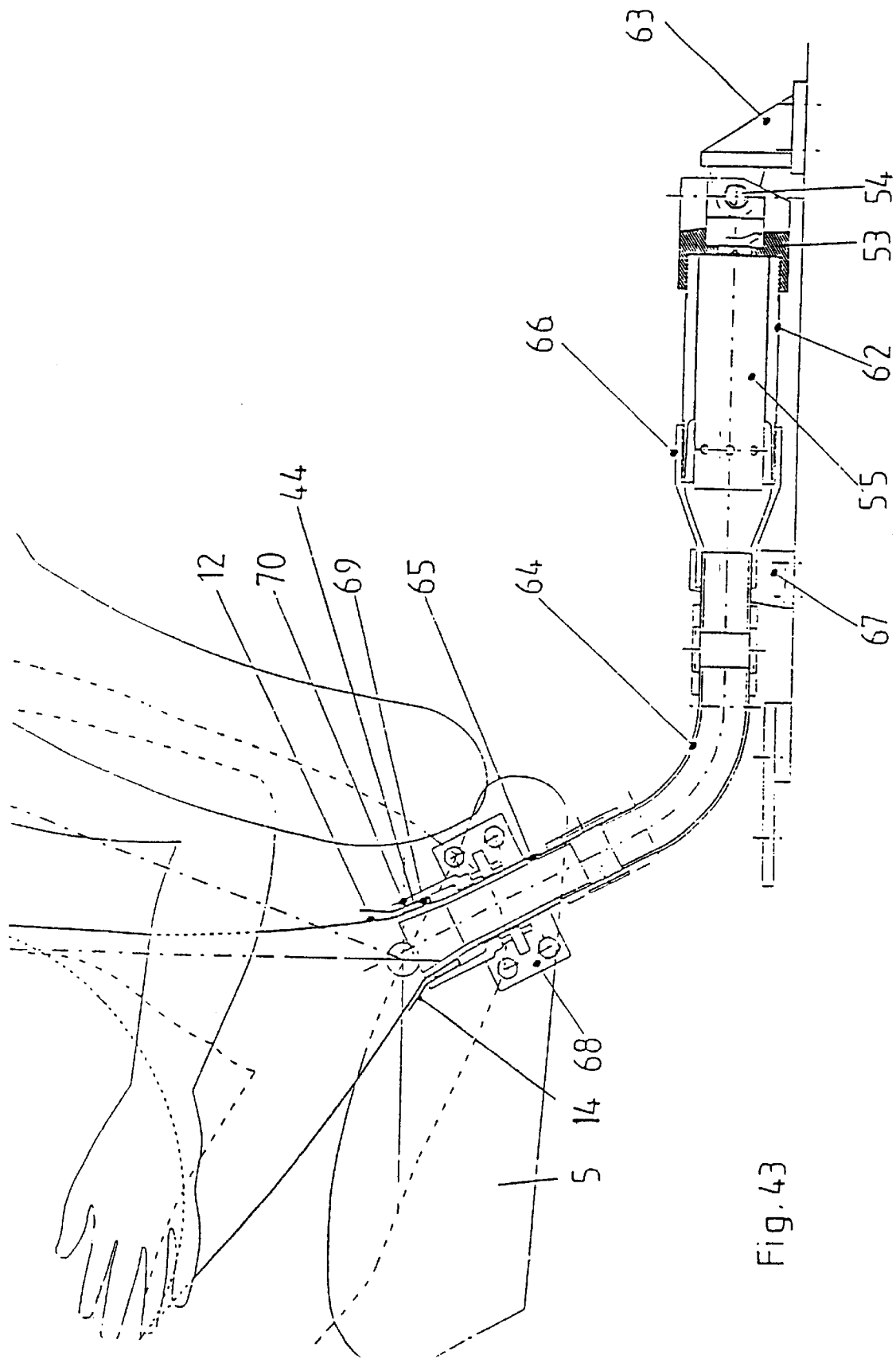
FIG. 43 shows a side view, partially in section, of the fastening of the generator side in the vehicle.

An embodiment with a gas generator mounted at the side behind the seat is shown in more detail in the side view of FIG. 43. The tubular gas generator 55 is fixed in a diffuser pipe 62 which in turn is fixed by a fastening part 53 and the bore 54 by means of a bolt on a fastening part 63 connected to the vehicle. The gas generator 55 is connected through a curved, flexible or rigid supply line 64 and a supply line end pipe 65 to the gas bag 12 wherein a connecting part 66 which is likewise connected to the floor of the vehicle by a fastening part 67 produces the connection. The supply line end pipe 65 is fixed by a fastening part 68 on the seat 5 or at the side on the bodywork.

In this embodiment, a type of connection between the gas bag 12 and component part, in this case the supply line end pipe 65, is shown which differs from FIGS. 34 to 36. The end 14 of the gas bag is also inverted outwards in this case. A wedge ring 69 is provided between the end 14 and the inverted section 44 and can be locked by a clamping part 70 which is pushed over the inserted section 44.

What is claimed is:

1. An gasbag retention system to be mounted in an area of a lower part of the body of a passenger in a motor vehicle comprising a gas bag to be laid, when in an inactivated state loosely on the body of the passenger; wherein the gas bag has two ends by means of which the gas bag is fixable on component parts of the motor vehicle wherein at least one end is detachably fixable on the motor vehicle.

2. An gasbag retention system according to claim 1 further comprising holders; wherein the ends of the gas bag can be fixed at the side or behind the passenger through the holders.

3. An gasbag retention system according to claim 2 wherein the ends of the gas bag are designed narrower than the remaining area of the gas bag to fit on the holders.

4. An gasbag retention system wherein the gas bag in the inactivated state is folded inside a cover.

5. An gasbag retention system according to claim 1 wherein the gas bag has one of a fan, lens, circular, and trapezoidal.

6. An gasbag retention system according to claim 1 wherein the gas bag has at least one partition provided with apertures to form a multi-chamber gas bag.

7. An gasbag retention system according to claim 1 wherein the gas bag is divided by at least one seam into several chambers which communicate with each other.

8. An gasbag retention system according to claim 1 wherein at least one band or cord runs loosely in and along an outer edge of the spread-out gas, empty bag, and wherein one end of the band is fixed inside the gas bag and the other end is fixed outside of the gas bag.

9. An gasbag retention system according to claim 1 further comprising at least one additional gas bag which unfolds in a different direction from a main gas bag.

10. An gasbag retention system according to claim 1 wherein the detachable end of the gas bag has a locking unit which can engage in a lock and in whose area one end of the gas bag runs as a flat band.

11. An gasbag retention system according to claim 1 wherein one end of the gas bag on a gas generator side is fixed on a diffuser pipe, coupled to a gas generator.

12. An gasbag retention system according to claim 1 wherein the area of the gas bag on a gas generator side fits on a supply line end pipe or a diffuser pipe and is enclosed there by a first holder part; wherein the end of the gas bag is inverted over the holder part; and is enclosed by at least one second holder part wherein the first and second holder parts adjoin one another next to the supply line end pipe or the diffuser pipe; and wherein the first and second holder parts are connected together and are connectable to the motor vehicle.

13. An gasbag retention system according to claim 1 wherein the area of the gas bag on a gas generator side sits on one of a supply line end pipe and a diffuser pipe and is enclosed by a wedge ring; and wherein the end of the gas bag is inverted over the wedge ring and is enclosed by a clamping part which has an inner cone.

14. An gasbag retention system according to claim 1 wherein a gas generator is fixed in a diffuser pipe and is connected by a curved, flexible or rigid supply line to a supply line end pipe which runs inclined upwards and forwards and on which the end of the gas bag on the gas generator side is coupled.

15. A motor vehicle comprising:

a seat for a passenger; and a gas bag;

wherein the gas bag has two ends by means of which the gas bag is fixed on component parts of the motor vehicle and wherein at least one end is detachably fixed on the motor vehicle; and wherein the gas bag in the inactivated state lies untensioned across the body of a passenger when a passenger is seated in the seat.

16. A motor vehicle according to claim 15 wherein the gas bag in the inactivated state lies untensioned on the upper thighs of the passenger when the passenger is seated in the seat.

17. A motor vehicle according to claim 15 further comprising a gas generator connected to an end of the gas bag wherein the gas generator is mounted to one of on a vehicle seat, next to a vehicle seat, on a central tunnel, on a floor and on a side wall.

18. A method of locating a gasbag relative to a passenger of a motor vehicle comprising:

locating the passenger on a seat of the motor vehicle;

fixing one end of the gasbag to the motor vehicle;

loosely laying the gasbag on the passenger;

detachably fixing another end of the gas bag to the motor vehicle.

* * * * *